3,227,563
PRESERVATIVE COMPOSITION FOR MARINE USE
George B. Fahlstrom, Williamsville, N.Y., assignor to Osmose Wood Preserving Co. of America, Inc., Buffalo, N.Y.
No Drawing. Filed June 25, 1962, Ser. No. 205,065
17 Claims. (Cl. 106—15)

This application is a continuation-in-part of application Serial No. 146,333, filed October 19, 1961, now abandoned.

This invention relates generally to the preservative art, and more specifically to a new and useful preservative composition particularly adapted for use in a marine environment to prevent penetration and fouling by marine organisms.

While the composition of my invention has been developed primarily for use in a preservative coating for marine use, it will also be effective in penetrating type preservatives. Accordingly, the term preservative as used herein is intended to include penetrating as well as film-forming types. Further, it is believed that the composition of this invention may have utility in other than marine environments.

When wood, metal, and other materials are subjected to a marine environment, they are immediately attacked by organisms which foul the surface thereof and/or penetrate the same. Fouling is particularly objectionable when it occurs on boats, because it presents a rough surface which materially increases the drag of the boat hull as it moves through the water, and because it adds to the weight of the boat and thereby often adversely affects its performance. Penetration of pilings and other members, as by marine borers, results in decimation and consequent weakening thereof, often to the point where the member must be replaced, which is of course objectionable.

The problem of preventing such marine fouling and penetration has received considerable attention over the years. The currently accepted standard anti-fouling agent is red cuprous oxide, which is incorporated into paint formulations intended for use as anti-fouling paint or coating materials. However, such material must be present in extremely high concentrations, in excess of 50% of the total composition by weight, resulting in a high cost formulation limited to only a few, dark colors. Furthermore, formulations containing this material will not function as a penetrating type preservative.

It has been shown that organo-tin compounds function as anti-fouling agents, when incorporated into marine finishes, and tests have shown that protection obtained by the use of such agents may be effective for a period up to about three months, under actual, constant exposure. However, its effectiveness degenerates rather rapidly thereafter, to substantially complete failure as an anti-fouling finish. Also, such tests have shown that a minimum of 10% by weight of such organo-tin compounds must be included in the formulation if it is to be effective, and paints designed for marine anti-fouling and containing the necessary 10% minimum concentration organo-tin compounds are characterized by exceptionally poor drying ability, and exhibit a greasy feel and appearance. This objectionable difficulty is believed to be caused by exudation or sweating of the organo-tin compound to the surface. It is further believed that such formulations are effective as an anti-fouling coating only while such a high concentration of the tin compound remains on the surface. At least a part of the organo-tin compound which is deposited on the surface in a free and uncombined state is subject to removal by water solubility and by mechanical action, and it appears that as this occurs the anti-fouling function degenerates.

Therefore, the use of organo-tin compounds as the anti-fouling agent does not completely solve the problem because the requisite concentration of the compound imparts objectionable qualities to the composition, and because the formulation is effectively only while such high concentration of the agent is present. In addition, the value of this material as the active agent for a penetrating type marine preservative is known to be doubtful.

Accordingly, the primary object of my invention is to provide a composition for marine use which provides extremely effective protection against fouling and penetration for substantial periods of time without adversely affecting the drying ability, feel, appearance and other physical properties desired in a marine finish.

A further object of my invention is to provide a composition for marine use having the above desired characteristics which may be applied either as a coating or as a penetrator of the material to be protected.

The foregoing and other objects, advantages and characterizing features of the composition of my invention will become clearly apparent from the ensuing detailed description thereof.

As noted above, organo-tin compounds have demonstrated effectiveness as anti-fouling agents, but only in concentrations so high as to impart objectionable and undesirable physical characteristics to the formulation. I have discovered that the desired objects may be obtained if a compound having a base of chlorinated methanobenzene is utilized in combination with the organo-tin compound anti-fouling agent. It has further been discovered that said methanobenzene compounds are at least partially effective as the active ingredient in an anti-fouling marine finish.

More importantly, I have discovered that these compounds may be combined with organo-tin compounds as the active agent in an anti-fouling marine finish, and that if these compounds are so combined, the resulting combination produces unexpectedly high anti-fouling activity and is much more effective in the elimination of surface fouling then either one of these compounds when used alone.

The chlorinated methanobenzene base compounds which are encompassed by my invention may be indicated as:

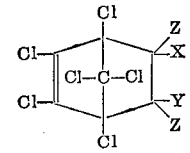

where X and Y, when taken separately, are organic, aliphatic or aromatic substituents selected from the group consisting of lower alkyl, chloro-lower alkyl, lower aklylene, chloro-lower alkylene, and phenyl, and when taken together from a divalent chain selected from the group consisting of:

(A)

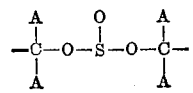

(B) 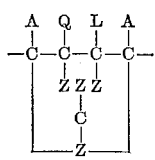

(C) 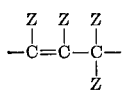

(D) 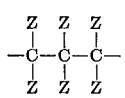

(E) 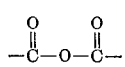

(F) 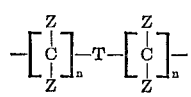

where Z is a hydrogen or chlorine atom; A is a member selected from the group consisting of hydrogen, lower alkylene, hydroxy, and phenyl; Q and L, when taken individually, are members selected from the group consisting of hydrogen, lower alkyl, oxygen, hydroxy, and phenyl, and when taken together form epoxy or phthalyl groups; T is a member selected from the group consisting of oxygen, nitrogen, and sulfur; and $n$ is an integer in the range of 1 to 2.

The expression "lower" used in defining the alkyl or alkylene groups of the above structures denote hydrocarbon groups having from 1 to 8 carbon atoms such as, the lower alkyl groups methyl, butyl, hexyl or octyl.

Specific examples of compounds encompassed by ths structure include:

(1) Hexachloro - hexahydro - methano - 2,4,3 - benzodioxathiepin - 3 - oxide (6,7,8,9,10,10 - hexachloro-1,1,5,5,5a,9a -hexahydro - 6,9 - methano - 2,4,3 - benzodioxathiepin-3-oxide), "Thiodan"
(2) Hexachloroepoxyoctahydro - endo, exo - dimethanonaphthalene (1,2,3,4,10,10 - hexachloro - 6,7, epoxy-1,4,4a,5,6,7,8,8a - octahydro - 1,4 - endo,exo - 5,8 - dimethanonaphthalene), dieldrin
(3) Hexachlorohexahydro - endo,exo - dimethanonaphthalene (1,2,3,4,10,10 - hexachloro - 1,4,4a,5,8,8a-hexahydro - 1,4 - endo,exo - 5,8 - dimethanonaphthalene), aldrin
(4) Hexachloroepoxyochtahydro - endo,endo - dimethanonaphthalene (1,2,3,4,10,10 - hexachloro - 6,7-epoxy-1,4,4a,5,6,7,8,8a - octahydro - 1,4 - endo,endo -5,8 - dimethanonaphthalene), endrin
(5) Heptachlorotetrahydro - endo - methanoindene (1,4,5,6,7,8,8 - heptachloro - 3a,4,7,7a - tetrahydro-4,7-endo-methanoindene), heptachlor
(6) Octachlorohexahydromethanoindene (1,2,4,5,6,7,8,8-octachloro - 2,3,3a,4,7,7a - hexahydro - 4,7 methanoindene), chlordan
(7) Octachlorotetrahydromethanophthalan, telodrin
(8) Chlorinated camphene, $C_nH_{2n}Cl_{n-2}$ or $C_nH_{2n+1}Cl_{n-3}$ or $C_nH_{2n-1}Cl_{n-1}$ (average formula $C_{10}H_{20}Cl_8$) where $n=10$, toxaphene I have determined that, because of an apparent synergism produced by the combination of chlorinated methanobenzene compounds with an organo-tin compound, excellent results are obtained even though relatively low concentrations of these compounds are used, as contrasted with the concentration required if either compound is used alone. As little as 1% of each of these materials by total weight, when combined in organic solvent solution together with a suitable resinous base, will produce effective anti-fouling characteristics in a coating. When as much as 7½% by total weight of each of the organo-tin compound and the methano benzene base compound are used, a much superior anti-fouling coating is produced. Further, such anti-fouling characteristics are provided without adversely affecting the physical properties of the coating. In other words, the objectionably long drying time, and the objectionable greasy feel and appearance that are produced when 10% or more of the organo-tin is used alone, is not present when even as much as 7½% each of the tin and chlorinated methanobenzene compounds are used in the composition of my invention.

However, additional quantities of these chemicals do not improve the anti-fouling performance of the resulting composition, and do adversely affect the coating. Accordingly, the combined concentration of these chemicals should fall within the range from a minimum of 2% to a maximum of substantially 15% by total weight of the resulting composition. I further believe that the preferred ratio of chlorinated methanobenzene compounds and organo-tin is 1:1, although they may be combined in other than equal proportions within the concentration range specified, namely: 1% to 7½% of each; and 2% to 15% combined.

The above noted percentage limitations are applied to coating compositions whereas impregnating compositions although operable in said range require a different concentration of ingredients for most advantageous results. It has been found that a minimum of .5% to a maximum of 5% of each of the organo-tin compound and the chlorinated methanobenzene base compound may be used in impregnating compositions to obtain the desired effects.

One example of a suitable coating composition of my invention is as follows, percentages being based upon total weight:

EXAMPLE 1

| | Percent |
|---|---|
| Polyurethane resin solids | 36.59 |
| Drier | .97 |
| Anti-oxidant | .10 |
| Red lead oxide | 19.00 |
| Bis(tri-n-butyltin) oxide | 3.33 |
| Thiodan | 3.33 |
| Mineral spirits | 36.68 |
| | 100.00 |

Different resins may be utilized although a water resistant resin base is preferred in order to avoid leaching of materials, and other organic solvents may be used. Also, organo-tin compounds other than the specific example given above can be used. Such compounds may be defined as triaryltin or trialkyltin compounds, and include triethyltin and triphenyltin acetates and tripropyltin and tributyltin chlorides as well as tributyltin oxide. By way of example, the following additional illustrative formulations may be used to produce a satisfactory anti-fouling finish, percentages again being based upon total weight. These specific examples show coating formulations with Thiodan as the synergistic activator but I have found that any of the other chlorinated methanobenzene compounds may be used with equivalent satisfactory results.

EXAMPLE 2

|  | Percent |
|---|---|
| Polyurethane resin solids | 38.04 |
| Drier | 1.19 |
| Anti-oxidant | .10 |
| Red lead oxide | 21.73 |
| Bis(tri-n-butyltin) oxide | 2.17 |
| Thiodan | 2.17 |
| Mineral spirits | 34.60 |
|  | 100.00 |

EXAMPLE 3

| Alkali refined linseed oil | 40.00 |
|---|---|
| Drier | .14 |
| Anti-oxidant | .06 |
| Titanium dioxide | 33.00 |
| Triethyltin acetate | 2.50 |
| Thiodan | 7.50 |
| Solvent diluent | 16.80 |
|  | 100.00 |

EXAMPLE 4

| Phthalic anhydride/soybean oil alkyd resin | 37.00 |
|---|---|
| Drier | .39 |
| Red lead oxide | 24.00 |
| Red iron oxide | 4.80 |
| Titanium dioxide | 4.80 |
| Anti-oxidant | .15 |
| Bentone 27 | 1.40 |
| Triphenyltin acetate | 7.00 |
| Thiodan | 5.00 |
| Solvent diluent | 15.46 |
|  | 100.00 |

EXAMPLE 5

| Dicyclopentadiene/linseed oil copolymer resin | 46.10 |
|---|---|
| Drier | .40 |
| Tributyltin chloride | 3.70 |
| Thiodan | 3.70 |
| Solvent diluent | 46.10 |
|  | 100.00 |

The effectiveness of the compositions of my invention, as contrasted with compositions using an organo-tin compound or chlorinated methanobenzene compounds alone, and as contrasted with compositions using cuprous oxide, other or no active ingredients for anti-fouling purposes, has been established by tests summarized as follows:

These tests were conducted by the Miami Marine Research Test Station at Miami Beach, Florida, following their standard procedures. In conducting the tests, two pieces of nominal lumber each measuring 1 inch by 4 inches by 12 were given two (2) coats of the test material, and the lumber so coated was submerged in the salt water of Biscayne Bay, Miami, Florida. The test material was observed monthly, and rated according to the degree of fouling observed. The best test results with each material over a four month period were as follows.

Table 1
SUMMARY OF TEST RESULTS

| Vehicle description | Active ingredient | Marine exposure rating, months | | | |
|---|---|---|---|---|---|
|  |  | 1 | 2 | 3 | 4 |
| (1) 36% polyurethane resin solids. | 2.0% tributyltin oxide plus 2.0% Thiodan, 20.0% red lead pigment. | 100 | 91 | 28 | 49 |
| (2) Same resin plus drier, 36% solids. | 3.5% tributyltin oxide plus 3.5% Thiodan 20% red lead pigment. | 100 | 100 | 79 | 37 |
| (3) 36% polyurethane resin solids. | 5.0% tributyltin oxide plus 5.0% Thiodan, 19% red lead pigment. | 100 | 100 | 90 | 60 |
| (4) Same resin plus drier, 50% solids. | 10.0% tributyltin oxide. | 100 | 93 | 85 | 52 |
| (5) Same resin plus drier 42% solids. | 19.6% red lead pigment. | 0 | 0 | 0 | 0 |
| (6) Same resin plus drier, 25% solids. | 55% copper oxide | 0 | 0 | 0 | 0 |
| (7) Same resin plus drier, 50% solids. | None | 0 | 0 | 0 | 0 |
| (8) Commercial "W".* | 52% copper oxide | 91 | 93 | 93 | 100 |
| (9) Commercial "V".* | 52% copper oxide | 0 | 0 | 0 | 0 |
| (10) Dicyclopentadiene linseed oil copolymer resin. | 1.4% Thiodan | 74 | 59 | 45 | 32 |
| (11) Same resin plus drier, 50% solids. | 7.0% Thiodan | 88 | 52 | 39 | 36 |

*Vinyl chloride resin.

In rating the material, a score of 100 indicates a complete absence of fouling, whereas a rating of 0 indicates complete surface fouling. If only incipient forms are present on the surface, the rating is reduced to 95. If adherent forms are present, the rating is obtained by subtracting from 95 the number of individual organisms and the percentage area covered by colonial forms.

Thus, it is seen that composition No. 3, containing a concentration of 10.0% of combined active agents, showed a complete absence of fouling after two months' exposure, and substantially less reduction in effectiveness, by comparison, occurred in succeeding months.

In contrast, a composition containing 10% of an organo-tin compound fell to a rating of 93 at the end of two months and deteriorated rapidly thereafter. Compositions containing Thiodan were markedly less effective, even at the end of one month.

Even as low a concentration as 4% of combined active agents in accordance with my invention (Example 1) showed a retained effectiveness at the end of four months comparable to that obtained with 10% tributyltin oxide. Further, the examples (1, 2 and 3) utilizing my invention did not have the undesirable physical characteristics of Example #4 using the requisite concentration of tributyltin oxide.

Furthermore, the compositions of my invention is soluble in the organic solvents commonly employed in paint formulations, and essentially colorless in the concentrations used. This permits the production of clear varnish type coatings (see formulation Example #5) as well as an infinite choice of color pigmentation. Such choice is not available with present standard commercial products such as test Example #8, which are available only in dark colors because of the copper oxide. Such commercial formulations also are relatively very expensive, because of the high concentration of copper oxide required.

The test results set forth above show that the base resinous material has no inherent anti-fouling value, and that common coloring pigments do not contribute to the anti-fouling protection. However, the base resinous material and pigment must be capable of withstanding exposure to sea water immersion, in order to make a satisfactory coating.

The above examples show the effectiveness of my composition when applied as coatings. Following are examples of the use of my composition as a penetrating formulation which finds wide application in protecting materials subject to destructive attack by marine life.

In each of these following examples a penetrating composition was prepared. Wood samples were impregnated with the compositions and the sample allowed to be subject to marine exposure for a number of months. Evaluation of the protection afforded was measured by the following logarithmic scale.

| Rating: | Description |
|---|---|
| 10 | No attack. |
| 9 | Light attack. |
| 7 | Moderate attack. |
| 4 | Heavy attack. |
| 0 | Very heavy attack or destroyed. |

Ratings are based on average rating of 4 exposure panels.

In the examples set forth in Table II, the solvent was cresote. The percentage additions and retentions of the additives are noted in the left hand columns. At the right in the table is the exposure rating in accordance with the above described scale of these various compositions after varying periods of time.

Table II
WOOD IMPREGNATION PRESERVATION (PRESSURE METHOD)*

| Test | Active ingredient | Percent | Lb./cu.ft. | Months marine exposure (average rating) | | |
|---|---|---|---|---|---|---|
| | | | | 4 | 8 | 12 |
| 1 | Creosote | 0 | 0 | 10 | 9.3 | 9.0 |
| 2 | Tributyltin oxide | .25 | .05 | 9.8 | 9.3 | 9.5 |
| 3 | do | 1.0 | .18 | 10 | 10 | 9.8 |
| 4 | Tributyltin oxide + Aldrin | .50 / .50 | .09 / .09 | 10 | 10 | 10 |
| 5 | Tributyltin oxide + Thiodan | .50 / .50 | .09 / .09 | 10 | 10 | 9.8 |
| 6 | Thiodan | 1.00 | .18 | 10 | 9.5 | 9.3 |

*The "pressure" method consists of (1) placing the panels under vacuum, (2) adding the penetrating solution, (3) forcing the solution under atmospheric pressure into the panel to about 18 lbs./cu.ft., and (4) reapplying vacuum to draw off excess.

In the examples of pentrating compositions shown in Tables III and IV, the solvent used was a petroleum oil distillate, and the percentage additions, and retentions (Table IV only), of the additives, and the exposure ratings, are as shown for Table II.

Table III
WOOD IMPREGNATION PRESERVATION (DIP METHOD)*

| Test | Active ingredient | Percent | Months marine exposure (average rating) | | | | | |
|---|---|---|---|---|---|---|---|---|
| | | | 2 | 3 | 4 | 6 | 8 | 10 |
| 7 | None | | 9.8 | 9.3 | 9.0 | 7.5 | 6.5 | 5.0 |
| 8 | Tributyltin oxide | 5 | 10 | 9.8 | 9.6 | 9.5 | 9.0 | 8.5 |
| 9 | Thiodan | 5 | 9.8 | 9.5 | 9.5 | 9.0 | 8.5 | 8.0 |
| 10 | Tributyltin oxide + Thiodan | 2 / 2 | 10 | 10 | 10 | 10 | 9.9 | 9.5 |
| 11 | Copper naphthenate, 3% Cu (Control). | | 10 | 9.8 | 9.8 | 9.6 | 9.5 | 7.5 |
| 12 | Tributyltin oxide + Chlordane | 1 / 1 | 10 | 10 | | | | |
| 13 | Tributyltin oxide + Endrin | 1 / 1 | 10 | 10 | | | | |
| 14 | Tributyltin oxide + Thiodan | 1 / 1 | 10 | 10 | | | | |
| 15 | Pentachlorophenol | 5 | 9.5 | 9.0 | | | | |
| 16 | Untreated | | 9.5 | 9.2 | | | | |

*The "dip" method relates to the application of the composition to the wood. It consists of dipping the wood panels into the composition for two-three minutes and allowing the excess to drain off.

Table IV
WOOD IMPREGNATION PRESERVATION (PRESSURE METHOD)*

| Test | Active ingredient | Percent | lb./cu.ft. | Months marine exposure† (average rating) | | | | |
|---|---|---|---|---|---|---|---|---|
| | | | | 2 | 4 | 8 | 12 | 16 |
| 17 | Tributyltin oxide + Dieldrin | 3.75 / 3.75 | .35 / .35 | 10 | 10 | 10 | 10 | 9.5 |
| 18 | Tributyltin oxide + Dieldrin | 2.80 / 2.80 | .27 / .27 | 10 | 10 | 9.8 | 9.5 | 9.0 |
| 19 | Tributyltin oxide + Dieldrin | 1.875 / 1.875 | .17 / .17 | 10 | 10 | 9.5 | 9.5 | 9.3 |
| 20 | Tributyltin oxide + Dieldrin | 1.17 / 1.17 | .10 / .10 | 10 | 10 | 9.5 | 9.3 | 9.0 |
| 21 | Tributyltin oxide + Aldrin | 3.75 / 3.75 | .34 / .34 | 10 | 10 | 9.7 | 9.3 | 9.0 |
| 22 | Tributyltin oxide + Aldrin | 1.875 / 1.875 | .18 / .18 | 10 | 10 | 9.5 | 9.5 | 8.8 |
| 23 | Tributyltin oxide | 3.75 | .33 | 10 | 10 | 9.5 | 9.0 | 7 |
| 24 | do | 1.875 | .17 | 10 | 10 | 9.0 | 7 | 4 |
| 25 | Untreated control | 0 | 0 | 9 | 7 | 6 | 3 | 2 |

*The "pressure" method consists of (1) placing the panels under vacuum, (2) adding the penetrating solution, (3) forcing the solution under pressure into the panel to the desired 18 lbs./cu. ft., and (4) reapplying vacuum to draw off excess.
†After regular inspection one panel of each group removed for cutting and thorough internal inspection. Good performance of groups A and B confirmed.

Tests have also shown that, in addition to preventing surface fouling, coating compositions of this invention are highly effective against marine borers, and therefore protects and preserves the underlying material by precluding penetration thereof by such marine organisms, as long as the coating is unbroken.

Accordingly, it is seen that my invention fulfills its intended object, in providing a marine finish which possesses unexpected higher anti-fouling characteristics with lower concentrations of the active ingredients, in which the desirable physical properties are not adversely affected.

Having fully disclosed and completely described my invention, what I claim as new is:

1. A preservative composition for use in a marine environment consisting essentially of from about .5 to about 7.5 weight percent of an organo-tin compound selected from the group consisting of triaryltin and tri-lower-alkyltin compounds and about .5 to 7.5% by weight of a chlorinated methanobenzene base compound.

2. A composition as set forth in claim 1 wherein the organo-tin compound and the chlorinated methanobenzene base compound are present in said composition in approximately equal proportions by weight.

3. A composition according to claim 1 wherein the organo-tin compound is tributyltin oxide and the chlorinated methanobenzene base compound is hexachloro-hexahydro-methano-2,4,3-benzodioxathiepin-3-oxide.

4. A composition according to claim 1 wherein the organo-tin compound is tributyltin oxide and the chlorinated methanobenzene base compound is hexachloro-epoxyoctahydro-endo,exodimethanonaphthalene.

5. A composition according to claim 1 wherein the organo-tin compound is tributyltin oxide and the chlorinated methanobenzene base compound is hexachloro-hexahydro-endo,exo-dimethanonaphthalene.

6. A composition according to claim 1 wherein the organo-tin compound is tributyltin oxide and the chlorinated methanobenzene base compound is octachloro-hexahydromethanoindene.

7. A coating composition for marine use comprising a film-forming compound, from about 1 to 7.5% by weight of an organo-tin selected from the group consisting of triphenyltin and tri-lower-alkyltin compounds, from about 1 to 7.5% by weight of compound, a chlorinated methanobenzene base compound, and an organic solvent for all of said compounds.

8. A coating composition according to claim 7 wherein the chlorinated methanobenzene base compound is hexachloro-hexahydro-methano-2,4,3-benzodioxathiepin-3-oxide.

9. A composition according to claim 1 wherein the organo-tin compound is tributyltin oxide and the chlorinated methanobenzene base compound is hexachloro-epoxyoctahydro-endo,endo-dimethanonaphthalene.

10. A composition according to claim 1 wherein the organo-tin compound is tributyltin oxide and the chlorinated methanobenzene base compound is heptachloro-tetrahydro-endo-methanoindene.

11. A composition according to claim 1 wherein the organo-tin compound is tributyltin oxide and the chlorinated methanobenzene base compound is chlorinated camphene.

12. A composition according to claim 1 wherein the organo-tin compound is tributyltin oxide and the chlorinated methanobenzene base compound is octachlorotetra-hydromethanophthalan.

13. An impregnating composition for marine use consisting essentially of from about .5 to 5% by weight of an organo-tin compound selected from the group consisting of triphenyl and tri-lower-alkyltin compounds, from about .5 to 5% by weight of a chlorinated methanobenzene base compound and a solvent for said compounds.

14. A composition according to claim 13 wherein the organo-tin compound is tributyltin oxide and the chlorinated methanobenzene base compound is hexachlorohexa-hydromethano-2,4,3-benzodioxathiepin-3-oxide.

15. A composition according to claim 13 wherein the organo-tin compound is tributyltin oxide and the chlorinated methanobenzene base compound is hexachloro-epoxyoctahydro-endo,exo-dimethanonaphthalene.

16. A composition according to claim 13 wherein the organo-tin compound is tributyltin oxide and the chlorinated methanobenzene base compound is hexachlorohexa-hydro-endo,exo-dimethanonaphthalene.

17. A composition according to claim 13 wherein the organo-tin compound is tributyltin oxide and the chlorinated methanobenzene base compound is hexachloro-epoxyoctahydro-endo,endo-dimethanonaphthalene.

References Cited by the Examiner

UNITED STATES PATENTS

| | | | |
|---|---|---|---|
| 2,587,484 | 2/1952 | Kittleson et al. | 167—30 |
| 2,925,445 | 2/1960 | Bluestone | 167—30 XR |
| 2,932,669 | 4/1960 | Haubein | 167—30 XR |
| 2,957,785 | 10/1960 | Leatherland | 106—15 XR |
| 2,974,030 | 3/1961 | Geary | 167—30 XR |
| 2,996,426 | 8/1961 | Galloway | 167—30 XR |
| 3,060,085 | 10/1962 | Frensch et al. | 167—13 |
| 3,090,817 | 5/1963 | Schmerling | 260—648 |
| 3,111,456 | 11/1963 | Hochman et al. | 106—15 XR |

ALEXANDER H. BRODMERKEL,
*Primary Examiner.*

MORRIS LIEBMAN, ROBERT F. WHITE,
*Examiners.*